March 4, 1952     B. C. DILL     2,587,708
SEED TREATER

Filed June 14, 1948     4 Sheets-Sheet 1

INVENTOR.
BERT C. DILL
BY
ATTORNEY

March 4, 1952     B. C. DILL     2,587,708
SEED TREATER

Filed June 14, 1948     4 Sheets-Sheet 2

*INVENTOR.*
BERT C. DILL
BY
ATTORNEY

March 4, 1952  B. C. DILL  2,587,708
SEED TREATER
Filed June 14, 1948  4 Sheets-Sheet 3
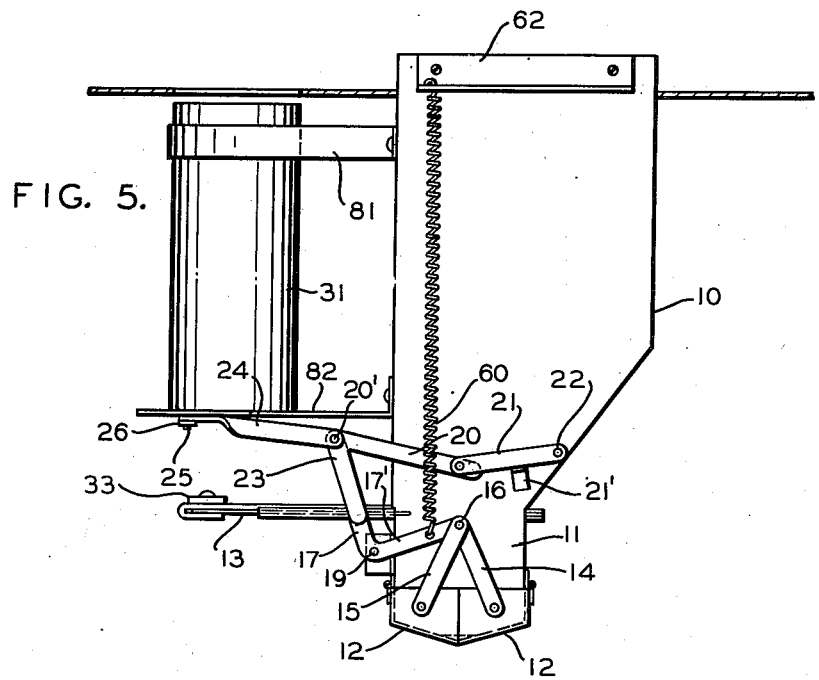
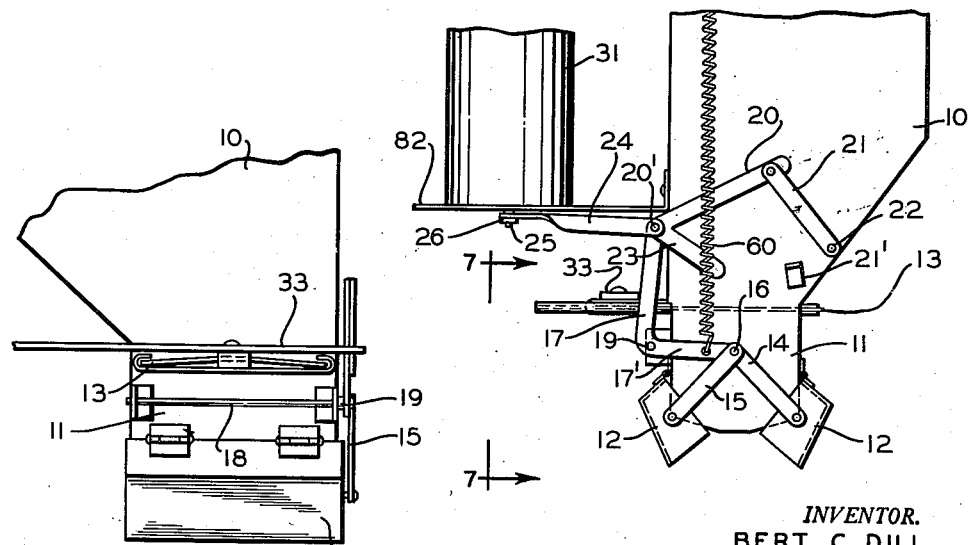
INVENTOR.
BERT C. DILL
BY *Howard F. Fischer*
ATTORNEY March 4, 1952 B. C. DILL 2,587,708
SEED TREATER
Filed June 14, 1948 4 Sheets-Sheet 4
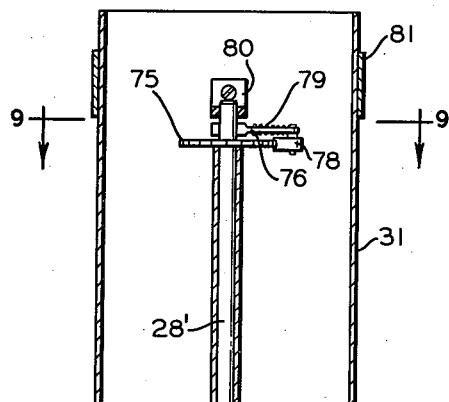
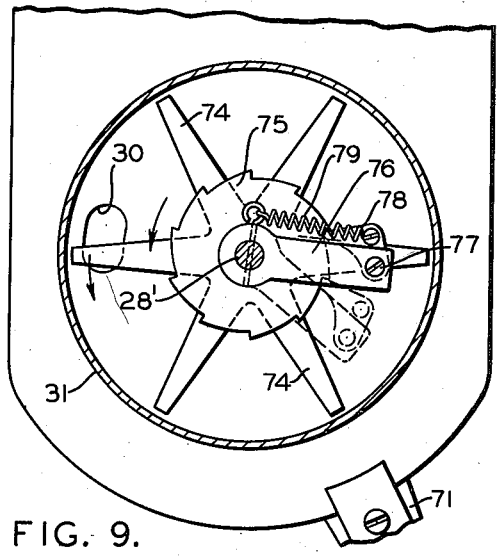
FIG. 9.
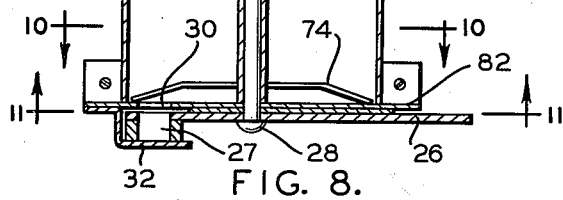
FIG. 8.
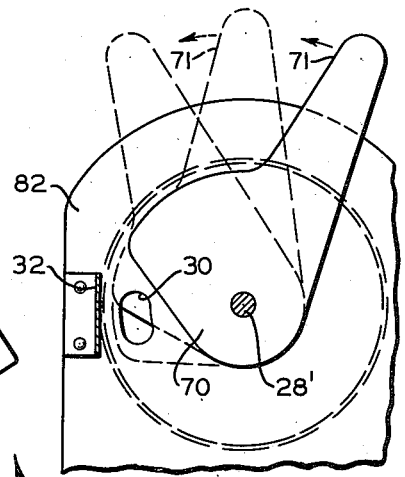
FIG. 11.
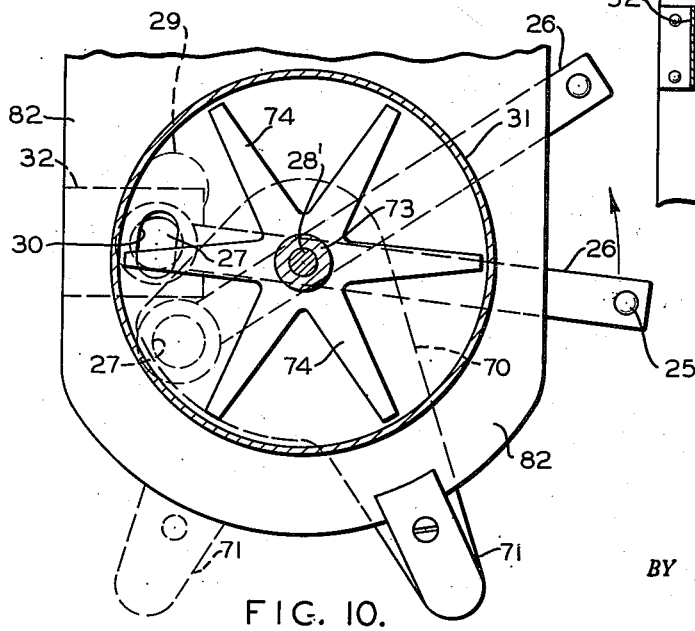
FIG. 10.
INVENTOR.
BERT C. DILL
BY
ATTORNEY Patented Mar. 4, 1952

2,587,708

UNITED STATES PATENT OFFICE 2,587,708

SEED TREATER

Bert C. Dill, Oakes, N. Dak.

Application June 14, 1948, Serial No. 32,951

4 Claims. (Cl. 259—8)

My invention relates to an improvement in a seed treater of a type which accurately measures a given amount of seed which is discharged into an enclosing drum together with an accurately measured correct amount of chemical to be mixed with the seed so as to treat the same for the protection of plants against various kinds of root diseases.

Experiments have shown that much larger crop yields are secured by treating seed before it is planted as compared with crop yields from untreated seed.

My invention includes a seed hopper having a seed measuring compartment with releasable dumping doors on the bottom thereof. The seed measuring compartment holds a given amount of seed and has a sliding door on the upper portion of the compartment separating it from the bottom of the hopper and allowing the seed measuring compartment of the seed hopper to be filled through lever mechanism for operating the sliding door. Adjacent the seed hopper and secured thereto is a chemical supply tank adapted to be filled with a dry or powdered seed protector having means for discharging a precise measured amount of chemical into a measured amount of seed which has been deposited by means of the dumping doors into a drum which encloses both the seed hopper and the chemical tank. The discharge means of the chemical tank is opened simultaneously with the opening of the seed dumping doors.

The measured amount of seed and chemical for treating the seed remains in the bottom of the drum where it is agitated by revolving vanes for a pre-determined period of time until all of the seed has been thoroughly treated and disinfected and a portion of the chemical disinfectant adheres to the skin or surface of the seed to protect the same. Then the treated seed is discharged from the seed treater and may be elevated into a bin or truck.

I provide a drum-like casing for enclosing the seed hopper and the chemical tank to confine the chemical within the same and protect the operator using my seed treater. Furthermore, the casing acts to enclose the working parts of the seed hopper unit and the chemical or antiseptic supply tank.

A further object of my device resides in providing a seed treater unit which includes an electric motor for operating the mixing vanes in the casing or drum and also for operating the levers which dump the seed from the hopper, and all of the working parts of the chemical disinfectant tank as well as providing the power means for driving an elevator for elevating the treated seed. This unitary seed treater may be of a portable nature as a whole so that it may be readily moved from place to place.

In the drawings forming a part of this specification:

Figure 5 is a diagrammatic view of my seed hopper and chemical container showing the same removed from the outer enclosing casing and illustrating the seed dumping doors in closed position with the gate of the seed hopper open to admit seed into the measuring compartment of the hopper.

Figure 6 is a view similar to Figure 5 with the seed dumping doors open and the gate of the seed hopper closed.

Figure 7 is a detail of a portion of the lower end of the seed hopper looking in the direction of the arrows 7—7 shown in Figure 6.

Figure 8 is a vertical section of the chemical tank.

Figure 9 is an enlarged section on the line 9—9 of Figure 8.

Figure 10 is an enlarged section on the line 10—10 of Figure 8.

Figure 11 is a sectional detail on the line 11—11 of Figure 8 looking upward in the direction of the arrows and showing in one position (in full lines) the adjustable plate valve which is also shown in dotted outline to indicate the adjustable nature of the plate valve.

Figure 1:
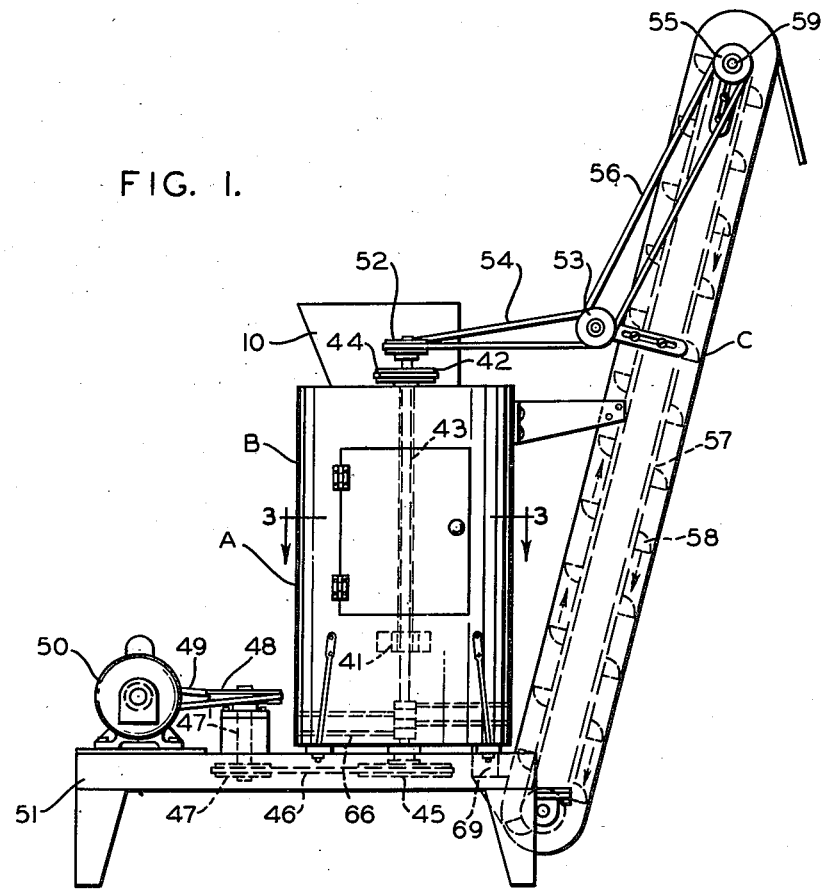
Figure 1 is a side view of my seed treater showing an elevator in operating connection therewith.
Figure 2:
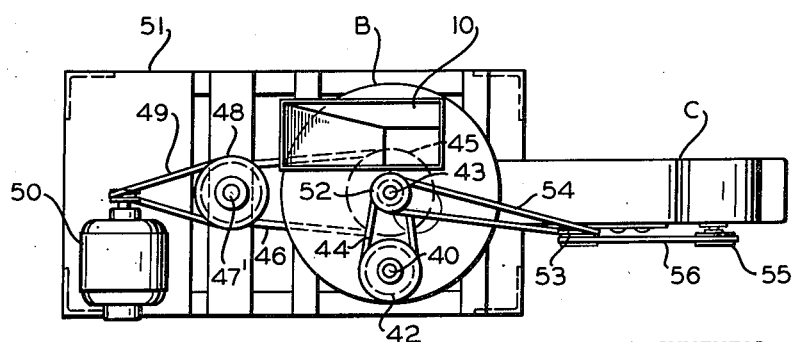
Figure 2 is a plan view thereof.

My seed treater is composed of a seed treating unit A consisting in part of a supply hopper 10 which is adapted to be positioned within a drum or casing B. Secured to the bottom of the hopper 10 is a seed measuring compartment 11 upon the bottom of which are hinged the seed dumping doors 12. Mounted between the bottom of the hopper 10 and the seed measuring compartment 11 is the slidable gate 13, the operation of which will be hereinafter set forth. The gate 13 is adapted to open or close off the top of the seed measuring compartment 11. The seed dumping doors 12 are opened by a mechanism consisting of the levers 14 and 15 which are pivoted on the ends of the dumping doors 12. The levers 14 and 15 are pivoted together on their outer ends at point 16 together with the outer end of the L-shaped lever 17 which pivots on the rod 18 at point 19. The upper end of the L-shaped lever 17 is pivotally secured to the V-shaped member 20. Pivoted to the outer long arm of the V-member 20 is a stop lever 21 which is pivoted to the side of the hopper 10 at point 22. When the dumping doors 12 are closed, the short leg 23 of the V-member 20 is adjacent to and in the same plane as the upper end of the L-shaped lever 17. Pivotally secured to the apex 20' of the V-shaped member 20 together with the upper end of the L-shaped arm 17 is the lever 24 which is pivoted at point 25 to the arm 26. Formed on one end of the arm 26 is a chemical receiving pocket 27, the arm 26 being pivoted at point 28 on the vertical shaft 28'. The flat lip 29 is formed integral with the chemical pocket 27 and projects from the side of the same, which prohibits chemical from dropping through the hole 30 formed in the bottom of the chemical supply tank 31 when the chemical compartment 27 has been moved out of alignment with the hole 30. When the pocket 27 is in line with the hole 30, the bottom of the pocket 27 is closed by the depending angular lip 32.

Figure 3:
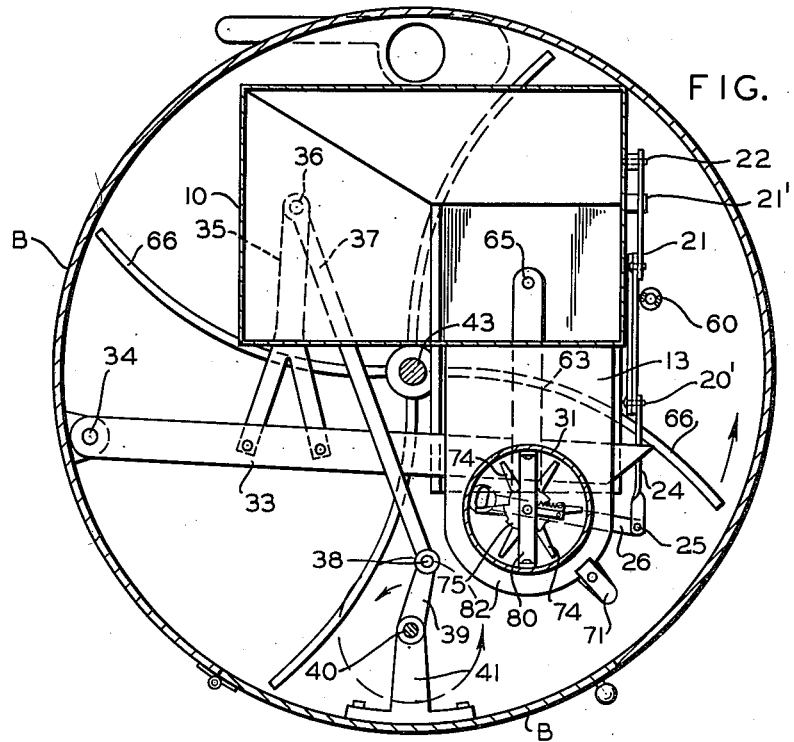
Figure 3 is a section on the line 3—3 of Figure 1.
Figure 4:
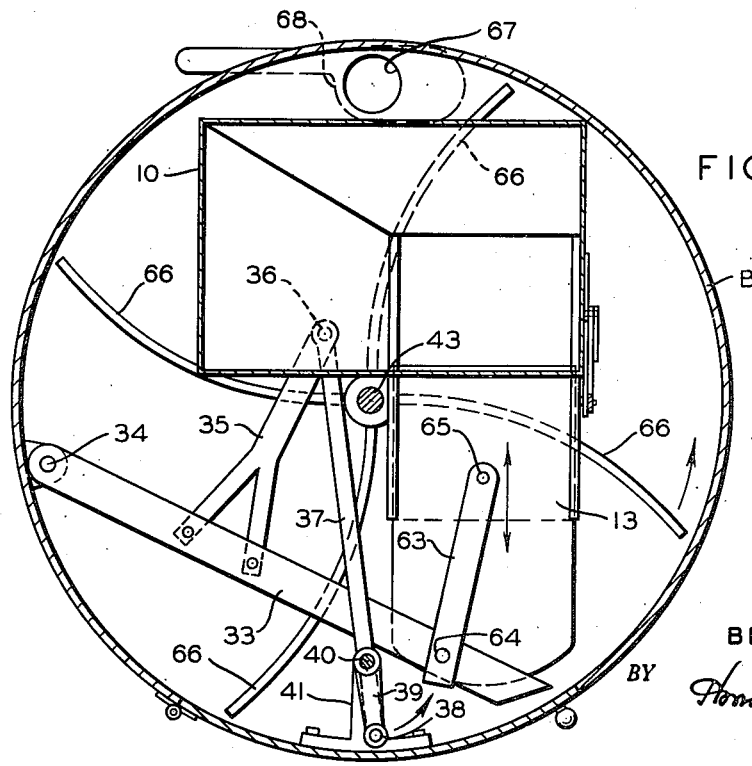
Figure 4 is a section similar to that found in Figure 3, with the chemical tank removed.

The lever arm 33 which opens the dumping doors 12 and actuates the chemical receiving pocket 27 is pivotally secured to the inside of the drum B at point 34. The arm 33 is actuated through the rigid arm 35 which is pivoted at 36 to the arm 37 which is pivoted at 38 to the crank arm 39 which in turn is revolved in the direction of the arrows in Figures 3 and 4 by the shaft 40. The shaft 40 is supported at its lower end in a bearing supported by the bracket 41 secured to the inner wall of the casing B and is illustrated in Figures 1, 3 and 4. The upper end of the shaft 40 is driven by the pulley 42 which is driven by the shaft 43 by means of the belt 44. The shaft 43 extends vertically throughout the drum B and is driven at its lower end by means of the pulley 45 through the belt 46 which is positioned on the pulley 47 which in turn is driven by the pulley 48 through the shaft 47'. The pulley 48 is driven by the belt 49 positioned on a pulley mounted on the motor 50 secured to the base standard 51. The drum B is also secured to the base standard 51.

On the top end of the shaft 43 is secured a pulley 52 which drives the adjustable double pulley 53 by means of the belt 54. The pulley 53 in turn drives the pulley 55 by means of the belt 56. The endless elevator belt 57, having the cups 58 secured thereon, is positioned around the shaft 59 which is attached to the pulley 55 and driven thereby.

The dumping doors 12 are maintained in a closed position by means of the spring 60 which is attached to the lower leg 17' of the L-shaped member 17, the upper end of the spring being attached to the bracket 62 which is secured to the upper portion of the supply hopper 10. When the long arm of the V-shaped member 20 is below dead center as illustrated in Figure 5, the dumping doors 12 cannot be opened by pressure thereon due to the flow of seed into the compartment 11. The long arm of the V-shaped member 20 is positioned slightly below dead center as in Figure 5 by the limited downward movement of the arm 21 against the stop angle 21' which is secured to the wall of the hopper 10. As the long arm of the member 20 is moved upward beyond dead center by means of pressure exerted on the short leg 23 of the member 20 in a direction to the right in Figure 5, the doors then begin to open as the arm 33 is moved in the said direction in Figures 5 and 6, actuating both the short arm 23 and the upper leg of the L-shaped arm 17 to positions shown in Figure 6 where the dumping doors 12 are fully opened by means of the lever mechanism. As the lever arm 33 moves in the direction of the arrow in Figure 5 against the upper leg of the L-shaped arm 17, the lever 24 is also moved in the direction of the arrow, thereby moving the arm 26 so that the chemical pocket 27 is moved out of alignment with the depending angular lip 32 as illustrated in the dotted line position shown in Figure 10, so that the chemical collected in the pocket 27 will be deposited upon seed which has been discharged into the bottom of the drum or casing B from the dumping doors 12.

As the arm 33 is moved from the position shown in Figure 3 to that shown in Figure 4, the slidable gate 13 is moved in the direction of the arrow thereon by means of the lever 63 which is pivoted to the arm 33 at point 64 and pivoted to the slidable gate 13 at point 65. As the gate is drawn in the direction of the arrow in Figure 4, the seed contained in the hopper 10 enters the seed measuring compartment 11, the dumping doors being closed as illustrated in Figure 5. When the gate 13 is moved into the position as illustrated in Figures 6 and 3, it closes the bottom entrance of the hopper into the seed compartment 11.

When the slidable gate 13 is in a withdrawn position (as indicated in Figure 5), the compartment 11 is filled with seed and the dumping doors 12 withstand the weight of the seed by means of the spring 60 together with the fact that the arms 20 and 21 are positioned below dead center as illustrated in Figure 5 and hereinbefore mentioned. As the arm 33 moves toward the hopper 10, it also moves the slidable gate 13 in the same direction, thus closing off the bottom of the hopper and leaving a measured amount of seed in the compartment 11. As the bar or arm 33 continues to move toward the hopper 10, it actuates the mechanism hereinbefore described to open the dumping doors and automatically release the measured amount of seed which has been deposited therein from the hopper 10. At the same time, through the mechanism described the chemical pocket 27 which receives chemical from the chemical tank 31 is moved in position to deposit the chemical upon the seed deposited in the bottom of the drum B where both are mixed together by means of the arcuated vanes 66 which are actuated by and secured to the central shaft 43. The vanes 66 are curved and also positioned at an angle so as to throw the seed toward the outside of the bottom of the drum as well as upward, giving an effective stirring motion.

Formed in the bottom of the drum B is the aperture 67 which has a suitable closure member 68. The unit is caused to operate for a period of time which is long enough to build up a mixture of chemical and seed in the bottom of the drum B to a depth of about six or eight inches, at which time the aperture 67 is opened by means of the closure member 68 so that the treated seed will fall from the drum B down the conduit 69 to the bottom of the elevator means C where it is hoisted into a bin or truck which is positioned adjacent the treater unit.

The size of the hole 30 formed in the bottom of the chemical supply tank 31 may be varied by means of the irregular shaped plate 70 which is pivoted centrally of the bottom of the tank 31 and provided with the extension handle 71 which is movable into various positions to decrease or increase the size of the opening 30. In Figure 11 the full line position of the member 70 allows the hole 30 to be fully opened. The dotted line positions in Figure 11 show the hole 30 partially reduced in size and wholly covered. As a result, the amount of chemical allowed to be deposited in the chemical compartment 27 is thereby regulated by the positioning of the irregular shaped member 70 which is adjusted by the extension handle 71.

The lever 26 is fastened to the lower end of the shaft 28' at point 28. The shaft 28' is rotated about a quarter turn through the movement of the arm 26. The shaft 28' is positioned within a tubing 73 and rotates therein. Secured adjacent the lower end of the tubing 73 are the chemical agitating vanes 74 which cause the chemical to be kept more or less level in the bottom of the tank 31 and moved to the hole 30 formed in the bottom of the tank 31. Secured to the top of the tubing 73 is the ratchet wheel 75. The arm 76 is secured to the top portion of the shaft 28' just above the ratchet wheel 75. Pivoted to the outer end of the arm 76 at point 77 is the pawl 78 which is adapted to engage the ratchet wheel 75 and held in engagement therewith by the small coil spring 79. As the lever 26 rotates the shaft 28' approximately one-eighth turn, the shaft 28' through the means of the arm 76 and the pawl 78 acting against the ratchet wheel 75, turns the agitating vanes 74 in the direction of the arrow in Figure 9. The uppermost end of the shaft 28' is positioned in a bearing hole formed in the center of the bracket 80 which is secured inside the upper portion of the chemical tank 31.

The chemical tank 31 is mounted on the hopper 10 by means of the bracket 81 and the plate member 82 which plate member also forms the bottom of the chemical tank 31.

My seed treater A is operated in the following manner:

The adjustable extension handle 71 is put in position to give the correct size opening of the hole 30, thereby allowing the correct amount of chemical to enter the chemical pocket 27. The mechanism is so positioned before starting the cycle of operation that the arm 33 is in the position illustrated in Figure 6. In this position the gate 13 is closed and the hopper 10 may be filled with seed and the chemical hopper filled with the proper chemical for treating the given seed. The top of the drum is then closed so as to prohibit the escape of chemical fumes from the inside of the barrel. The top of the barrel or drum B forms a closure around the top of the hopper 10. The motor 50 or any suitable power means is then started in operation and through the mechanism provided, the shafts 43 and 40 are caused to rotate. Through the circular motion of the cam arm 39 together with the lever means hereinbefore described, the arm 33 moves from the position as shown in Figure 5 to that shown in Figure 6, and as a result of the mechanism herein described and provided, the dumping doors 12 are caused to assume the position shown in Figure 6, the compartment 11 having been filled when the gate 13 was in the position illustrated in Figure 5. When the gate 13 fully closes off the bottom of the hopper 10, the dumping doors 12 then begin to open and are fully opened as the bar 33 resumes its travel and reaches the position shown in Figure 6. As the bar 33 moves from the position shown in Figure 6 to that shown in Figure 5, the dumping doors are thereby closed through the mechanism provided, including the spring 60, and at the same time the gate 13 is withdrawn from beneath the bottom opening of the hopper 10, allowing another supply of seed to enter the seed compartment 11.

The unit is allowed to operate until about six or eight inches of seed and chemical have accumulated and are being mixed by means of the vanes 66, at which depth the aperture 67 is opened and the treated seed may fall therethrough and be carried by the elevator C by means of the cups 58 to a bin or truck. The level of six or eight inches in a given size unit will be maintained once it is attained. As hereinbefore set forth, the chemical pocket 27 drops a supply of chemical beyond the depending lip 32, depositing the same upon the seed in the bottom of the drum B where the chemical is mixed with the seed for a period of time which is dependent upon the level of mixture attained in the first instance. The mixture of chemical and seed must remain within the drum a sufficient time for the chemical to completely mix with and cover the seed to be treated.

I claim:

1. A seed treater including a seed hopper, a seed measuring compartment secured to the bottom of said hopper, a flat gate slidably positioned between said hopper and said compartment, said gate being movable to positions providing open and closed communication between said hopper and said compartment, dumping doors hingedly secured to the bottom of said seed compartment, a chemical supply tank adjacent said hopper, lever means for opening and closing said dumping doors and for moving said gate to said open and closed positions, a discharge hole formed in the bottom of said chemical tank, a chemical measuring pocket movably positioned below said discharge hole, means for actuating said chemical measuring pocket to discharge the contents thereof, means connecting said lever means to said means for actuating said chemical measuring pocket, means for agitating a chemical in said chemical supply tank, power means for actuating said lever means and said chemical pocket actuating means, said lever means actuating said slidable gate to close the bottom of said hopper when said dumping doors are open and open the same when said dumping doors are closed for the entrance of seed into said seed measuring compartment, an enclosure for said chemical tank and hopper, and means for agitating seed and chemical deposited in the bottom of said enclosure from said hopper and said chemical tank.

2. A seed treater having a casing, a base upon which said casing is mounted, a door into said casing, a seed hopper within and projecting from said casing, said hopper including a measuring compartment at its lower end for selecting a predetermined amount of seed from said hopper, means for closing said measuring compartment at the top, means for closing said measuring compartment at the bottom, a disinfectant reservoir adjacent said seed reservoir, a measuring unit for said disinfectant reservoir, a stirring means in said disinfectant reservoir to cause the disinfectant to be discharged into said measuring means, means opening said last recited closing means for automatically discharging the seed from said measuring compartment and means simultaneously discharging a predetermined amount of disinfectant from said disinfectant reservoir, said casing providing an enclosed chamber for the mixing of the disinfectant and the seed, power means on said base adapted to operate said seed and disinfectant releasing means, paddle means in said casing operated by said motor for mixing the seed and disinfectant together, and an elevator cooperatively associated with said casing and adapted to be operated by said motor to elevate the treated seed.

3. A seed treater including a seed reservoir, a drum enclosure therefor, means for measuring an amount of seed from said reservoir, means for depositing the measured seed to supply the proper amount of chemical for treating the measured amount of seed in the bottom of said drum enclosure, a powdered chemical supply tank secured adjacent said seed reservoir, means for agitating the powdered chemical in said chemical tank, an aperture formed in the bottom of said tank, means for varying the size of said aperture, pocket means associated with said aperture for depositing a measured amount of powdered chemical from said tank into said drum with the seed, power means for actuating said measuring means and said agitating means, and power actuated means for mixing the chemical with the seed to coat the individual seeds with the chemical.

4. A seed treating device including a casing in which the seed is adapted to be treated, means for supporting a supply of seed to be treated in said casing, means secured in said casing adjacent said seed supply means for holding a supply of powdered disinfectant, means for agitating the powdered disinfectant in said holding means, means secured to said disinfectant supply means for depositing a predetermined amount of powdered disinfectant with a predetermined amount of seed to be treated into the bottom of said casing, and means in said casing for thoroughly mixing the seed with the disinfectant for a predetermined period to bring all of the seed in contact with the disinfectant powder, said casing forming an enclosure in which the seed is treated to protect the operator from the disinfectant powder.

BERT C. DILL.

REFERENCES CITED

The following references are of record in the file of this patent:

UNITED STATES PATENTS

| Number | Name | Date |
| --- | --- | --- |
| 543,182 | Hunt | July 23, 1895 |
| 851,686 | Muir et al. | Apr. 30, 1907 |
| 903,617 | Suiter | Nov. 10, 1908 |
| 1,023,411 | Behrmann | Apr. 16, 1912 |
| 1,226,108 | Olney | May 15, 1917 |
| 1,969,533 | Pipes et al. | Aug. 7, 1934 |
| 2,190,044 | Pollitz | Feb. 13, 1940 |
| 2,207,196 | Haven | July 9, 1940 |
| 2,252,150 | Whitfield | Aug. 12, 1941 |
| 2,463,995 | Nielsen | Mar. 8, 1949 |